United States Patent
Tamura

(10) Patent No.: US 9,134,814 B2
(45) Date of Patent: Sep. 15, 2015

(54) INPUT DEVICE, DISPLAY SYSTEM AND INPUT METHOD

(71) Applicant: SEIKO EPSON CORPORATION, Tokyo (JP)

(72) Inventor: Akihiko Tamura, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 67 days.

(21) Appl. No.: 13/853,545

(22) Filed: Mar. 29, 2013

(65) Prior Publication Data

US 2013/0265228 A1    Oct. 10, 2013

(30) Foreign Application Priority Data

Apr. 5, 2012 (JP) ................................. 2012-086717
Jan. 22, 2013 (JP) ................................. 2013-008976

(51) Int. Cl.
G06F 3/033   (2013.01)
G06F 3/038   (2013.01)
G06F 3/042   (2006.01)
G06F 3/0354  (2013.01)

(52) U.S. Cl.
CPC .............. *G06F 3/033* (2013.01); *G06F 3/0383* (2013.01); *G06F 3/0386* (2013.01); *G06F 3/03545* (2013.01); *G06F 3/0425* (2013.01)

(58) Field of Classification Search
CPC ..... G06F 3/033; G06F 3/0383; G06F 3/0386; G06F 3/0425; G06F 3/03545
USPC .................. 345/156–184; 348/744; 356/138; 382/187; 710/17
See application file for complete search history.

(56) References Cited

U.S. PATENT DOCUMENTS

| | | | | |
|---|---|---|---|---|
| 5,252,951 | A * | 10/1993 | Tannenbaum et al. | 345/156 |
| 5,521,986 | A * | 5/1996 | Curtin et al. | 382/187 |
| 7,239,305 | B1 * | 7/2007 | Nakano et al. | 345/179 |
| 7,536,595 | B1 * | 5/2009 | Hiltunen et al. | 714/26 |
| 7,626,580 | B2 | 12/2009 | Keely et al. | |
| 7,921,361 | B2 * | 4/2011 | Gunn et al. | 715/256 |
| 8,676,273 | B1 * | 3/2014 | Fujisaki | 455/567 |
| 8,780,082 | B2 * | 7/2014 | Bernstein | 345/174 |
| 2002/0097230 | A1 * | 7/2002 | Lowry et al. | 345/175 |
| 2002/0118603 | A1 * | 8/2002 | Tamagawa et al. | 368/10 |
| 2002/0130836 | A1 * | 9/2002 | Ohmori et al. | 345/156 |
| 2003/0006973 | A1 * | 1/2003 | Omura et al. | 345/175 |
| 2004/0239763 | A1 * | 12/2004 | Notea et al. | 348/169 |
| 2005/0195387 | A1 * | 9/2005 | Zhang et al. | 356/138 |
| 2006/0197742 | A1 * | 9/2006 | Gray | 345/157 |
| 2007/0063987 | A1 * | 3/2007 | Sato et al. | 345/173 |
| 2007/0135178 | A1 * | 6/2007 | Albulet et al. | 455/574 |
| 2007/0146320 | A1 * | 6/2007 | Kubota | 345/157 |
| 2007/0262970 | A1 * | 11/2007 | Matsumoto et al. | 345/173 |
| 2007/0273655 | A1 * | 11/2007 | Yeh et al. | 345/169 |
| 2008/0042981 | A1 * | 2/2008 | Katz | 345/173 |
| 2008/0088599 | A1 * | 4/2008 | Gunn et al. | 345/173 |

(Continued)

FOREIGN PATENT DOCUMENTS

JP    A-2002-189567    7/2002

*Primary Examiner* — Prabodh M Dharia

(74) *Attorney, Agent, or Firm* — Oliff PLC

(57) ABSTRACT

A projector detects a first input operation and a second input operation using an operation detection section, detects an operation position of the input operation in an operation area in which the input operation can be detected, and notifies the first operation and the operation position when the second operation is not detected within a predetermined time from when the first input operation is detected.

15 Claims, 7 Drawing Sheets

(56) References Cited

U.S. PATENT DOCUMENTS

| | | | |
|---|---|---|---|
| 2008/0201108 A1* | 8/2008 | Furem et al. | 702/182 |
| 2009/0019188 A1* | 1/2009 | Mattice et al. | 710/17 |
| 2009/0097755 A1* | 4/2009 | Shingu et al. | 382/190 |
| 2010/0188333 A1* | 7/2010 | Capps | 345/157 |
| 2010/0188587 A1* | 7/2010 | Ashley et al. | 348/744 |
| 2010/0322435 A1* | 12/2010 | Suzuki et al. | 381/92 |
| 2012/0146934 A1* | 6/2012 | Davidson | 345/173 |
| 2012/0249489 A1* | 10/2012 | Onodera et al. | 345/179 |
| 2012/0287056 A1* | 11/2012 | Ibdah | 345/173 |
| 2013/0155031 A1* | 6/2013 | Dahl et al. | 345/177 |
| 2013/0265228 A1* | 10/2013 | Tamura | 345/157 |

* cited by examiner

INPUT DEVICE, DISPLAY SYSTEM AND INPUT METHOD

BACKGROUND

1. Technical Field

The present invention relates to an input device, a display system and an input method.

2. Related Art

In the related art, as an input device that is used in a computer such as a tablet type computer and the like, a configuration is known in which the display surface of a display is operated by a stylus (for example, refer to JP-A-2002-189567). The configuration of JP-A-2002-189567 discloses a method which detects various operations such as a tab, a stroke, a hold and a drag that are performed by the stylus and simulates a gesture of a pointing device such as a mouse that is associated for each operation. In this manner, an input device in which a predetermined operation is directly input by the stylus has a simple configuration, so that it is possible to perform an intuitive operation. In order to utilize the input device, for example, in the configuration of JP-A-2002-189567, if the computer detects the hold of the stylus, the computer simulates the second mouse button click of the mouse. This enables the computer to process the operation by the stylus as the operation of the mouse having two more buttons. In this case, if the operation that is classified into the hold of the stylus is performed, the computer performs a processing to feedback the operation in a visible manner, thereby operating the stylus in the similar sense to using the mouse.

In the configuration of JP-A-2002-189567, the computer classifies the operation of the stylus, and performs a processing such as feedback with respect to the hold operation. However, such an action requires a computer configuration which is intended to use the stylus. For example, a dedicated device driver program suitable for using the stylus or the function of an operating system corresponding to the above position input operation is needed. For this reason, the method of the related art is not a method that can be applied to a general-purpose computer without a particular configuration.

SUMMARY

An advantage of some aspects of the invention is to provide an input device, a display system, and an input method which can be used in input of a general-purpose computer and in which a same operation feeling as an operation by a general-purpose pointing device such as a mouse can be obtained.

An aspect of the invention provides an input device including an operation detection section which detects an input operation, a position detection section which detects an operation position of the input operation in an operation area in which the input operation can be detected by the operation detection section and an operation notification section which notifies a first operation and the operation position detected by the position detection section, when a second input operation is not detected within a predetermined time after a first input operation is detected by the operation detection section.

According to the aspect of the invention, when the second input operation is not detected within the predetermined time after the first input operation is detected, the first operation is notified. For example, using a relatively simple input device having at least two kinds of operation states, if another operation is not performed within a predetermined time after one operation is performed, the one operation is notified. For this reason, it is possible to adjust the timing at which the first operation is notified, depending on whether the second input operation is performed within a predetermined time. Further, for example, if the output of the operation signal of the general-purpose pointing device is performed as an action to notify the first operation, the input device can be used as a pointing device. Therefore, it is possible to achieve operability close to more multifunctional pointing device, using an input device having a simple configuration.

In the input device, after the first operation and an operation position detected by the position detection section are notified, the operation notification section may notify a release of the first operation.

In this case, the user performs the first input operation, thereby notifying the first operation and the release of the first operation.

Further, in the input device, after the first operation and an operation position detected by the position detection section are notified, the operation notification section may notify a release of the first operation before a second input operation is detected by the operation detection section.

In this case, if the user performs the first input operation, it is possible to perform the notification of the first operation and the release of the first operation before the second input operation is performed.

Further, in the input device, the operation notification section may notify the release of the first operation after a predetermined time elapses after the first operation and an operation position detected by the position detection section are notified.

In this case, the notification of the release of the first operation is performed with a predetermined time after the notification of the first operation is performed. For this reason, an apparatus which receives the notification of the operation may surely distinguish the notification of the first operation with the notification of the release of the first operation.

Further, in the input device, the operation notification section may perform other process without being accompanied by notification between a time when the first operation and the operation position detected by the position detection section are notified and a time when the second input operation is detected by the operation detection section.

In this case, it is possible to perform other process without performing the notification between a time when the first operation is detected and a time when the second input operation is performed, and efficiently proceed other processing. For this reason, it is possible to perform the other processing and proceed efficiently with the processing, using a wait time until the notification of the release of the first operation is performed. Further, it has an advantage of not affecting the device to be notified during the execution of other processing.

Further, in the input device, after the second input operation is detected by the operation detection section, the operation notification section may notify the release of the first operation.

In this case, after the first input operation is detected, if the second input operation is detected, the release of the first operation is notified. For this reason, it is possible for the user to cause "the release of the first operation" to be notified at any timing by performing the second input operation after the first input operation.

Further, in the input device, the operation notification section may notify a second operation different from the first operation, when a second input operation is detected within a predetermined time after the first input operation is detected by the operation detection section.

In this case, if the second input operation is detected within a predetermined time after the first input operation is detected, the second operation is notified. For this reason, it is possible for the user to cause the second operation different from the first operation to be notified by adjusting the timing to perform the second input operation. Therefore, it is possible to achieve operability close to more multifunctional pointing device using an input device having a simple configuration.

Further, in the input device, the release of the first operation may be notified, when the second input operation is detected after the first input operation is detected by the operation detection section, or a configuration in which the second operation different from the first operation is notified, when the second input operation is detected within a predetermined time after the first input operation is detected.

In this case, any one of two kinds of actions is performed, when the first input operation and the second input operation are performed. That is, any one of an action to notify the release of the first operation and an action to notify the second operation is performed at the timing when the second input operation is detected. Therefore, it is possible for the user to cause a desired notification out of two kinds of notifications to be performed by adjusting the timing of performing the second input operation.

Further, in the input device, after the second operation is notified, the operation notification section may notify the release of the second operation.

In this case, it is possible to notify the first operation, and notify the second operation and the release of the second operation in response to the first input operation and the second input operation. For this reason, it is possible to notify the first operation and the second operation and notify the release of each operation in response to the two kinds of the input operations.

Further, in the input device, the operation notification section may notify the second operation and the operation position detected by the position detection section.

In this case, it is possible to notify the operation position with respect to the second operation, so that it is possible to realize more versatile operations in response to the first input operation and the second input operation.

Further, the input device may be configured as a projector including a light modulation section which modulates a light emitted from a light source, an image forming section which forms a display image in the light modulation section based on image data and a projection section which projects a display image formed by the image forming section, and a range that the display image projected by the projection section displays is an operation area.

In this case, the projector which projects the display image based on the image data notifies the first operation in response to the first input operation in the range that the display image displays. This enables to achieve the same operability as the case of using the more multifunctional pointing device, in a state where the projector projects the display image, for example, using an input device having a simple configuration in which the number of the operator is small. Therefore, it is possible to intend the convenience improvement of the projector.

Another aspect of the invention provides a display system in which a projector detects an input operation that is input by an indicating body and notifies a computer of an operation in response to the input operation, and the computer executes the operation, the indicating body includes an operator and transmitting section which indicates an input operation that is input by the operator to the projector, the projector includes a light modulation section which modulates a light emitted from the light source, an image forming section which forms a display image in the light modulation section based on image data, a projecting section which projects a display image formed by the image forming section, an operation detection section which detects an input operation that is notified by the indicating body, a position detection section which detects an operation position of the input operation detected by the operation detection section in an operation area that the display image that is projected by the projecting section displays, and an operation notification section which notifies the computer of a first operation and an operation position detected by the position detection section, when a second input operation is not detected within a predetermined time after a first input operation is detected by the operation detection section, and the computer includes a control section which executes the first operation, based on the notification from the operation notification section.

According to the aspect of the invention, the projector which projects the display image based on the image data notifies the computer of the first operation based on the presence or the absence of the first input operation in the range that the display image displays and the second input operation within the predetermined time. The computer can perform the control corresponding to the first operation. For this reason, in a state where the display image is projected by the projector, for example, using the indicating body which has a simple configuration having small number of operators and is suitable for an input operation corresponding to the display image, it is possible to operate the computer similarly to a case of using more multifunctional pointing device. This enables for the user to comfortably operate the computer, using the display image of the projector. Further, by using the indicating body, it is possible to efficiently use display image of the projector and operate the computer.

Further, in the display system, the operation notification section may notify the computer of a second operation different from the first operation, when a second input operation is detected within a predetermined time after the first input operation is detected by the operation detection section, and the control section may execute the second operation, based on the notification from the operation notification section.

In this case, if the second input operation is detected within a predetermined time after the first input operation is detected, the second operation is notified. For this reason, it is possible for the user to cause the second operation different from the first operation to be notified by adjusting the timing of performing the second input operation. Therefore, using the input device having the simple configuration, it is possible to operate the computer similar to the case of using the more multifunctional pointing device.

Further, in the display system, the computer may include a pointing device having operators of two or more, and the operation notification section may notify the computer of the first operation as an operation by the first operator included in the pointing device, and notify the computer of the second operation as an operation by the second operator included in the pointing device.

In this case, the projector which projects the display image based on the image data detects the operation of the input device and performs the notification as two kinds of operations of the pointing device included in the computer. For this reason, in a state where the display image is projected, while using the input device having the simple configuration, it is possible to operate the computer similarly to the pointing device included in the computer.

Still another aspect of the invention provides an input method which detects a first input operation and a second input operation, detects an operation position of the input operation in an operation area in which the input operation can be detected, and notifies a first operation and an operation position, when a second input operation is not detected within a predetermined time after a first input operation is detected.

According to the aspect of the invention, depending on whether a second input operation is detected within a predetermined time after a first input operation is detected, the first operation is notified. Accordingly, using the input device having the simple configuration, it is possible to achieve operability close to more multifunctional pointing device.

According to the aspect of the invention, using the input device having the simple configuration, it is possible to achieve operability close to the more multifunctional pointing device.

BRIEF DESCRIPTION OF THE DRAWINGS

The invention will be described with reference to the accompanying drawings, wherein like numbers reference like elements.

FIG. 4A shows an example of a projection state and FIG. 4B shows an example of a case where the image is changed.

DESCRIPTION OF EXEMPLARY EMBODIMENTS

First Embodiment

Hereinafter, a description of the embodiment to which the invention is applied will be made referring to drawings.

Figure 1:
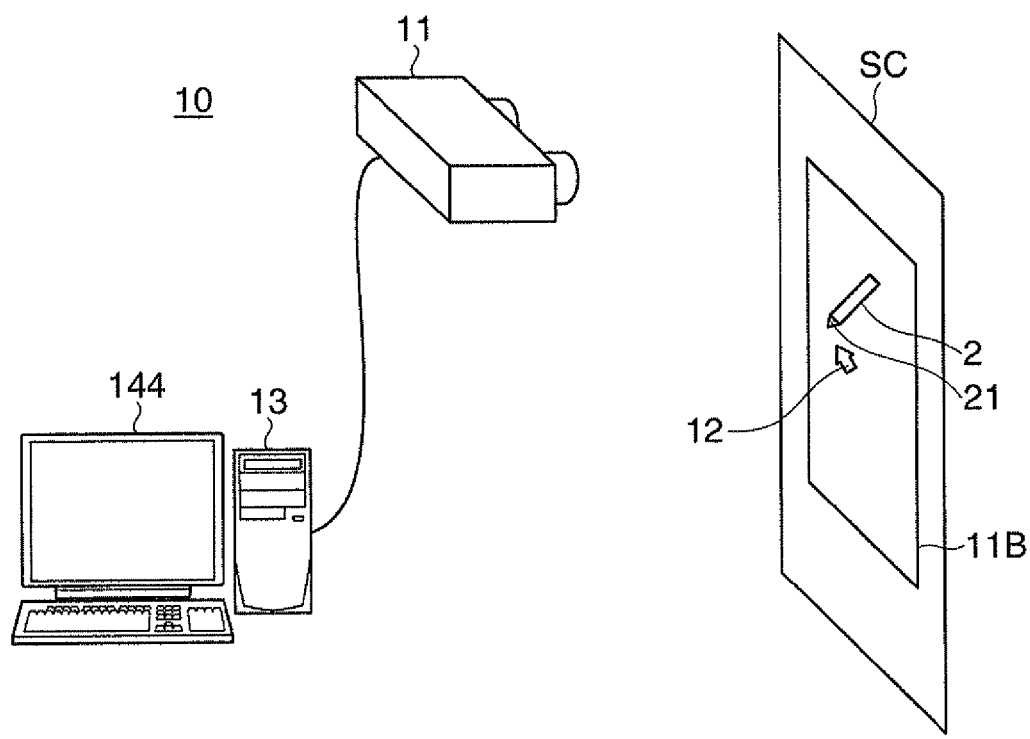
FIG. 1 is a view illustrating a configuration of a display system relating to a first embodiment.

FIG. 1 is a view illustrating a configuration of a display system 10 using a projector 11 relating to a first embodiment of the invention.

The projector 11 is wired connected to a PC (a personal computer) 13 through an image signal cable and the like. The projector 11, based on the image that is input from the PC 13, projects a display image to a screen SC as a projection surface (a display surface). Here, the range of the image to be projected on the projector 11 is an actual projection area 11B (a displayable area). The screen SC is not limited to a flat plate that is fixed in a wall surface as shown in FIG. 1, but the wall surface itself can be used as the screen SC.

In the display system 10, the user can perform a position indicating operation to indicate a position in the actual projection area 11B of the screen SC to the projector 11, while holding a pen-type indicator 2 (an indicating body) in a hand, that is a pen-type input device. A switch 21 is disposed in a leading edge of the pen-type indicator 2, if the user performs a press operation to press the pen-type indicator 2 to the screen SC, the switch 21 is pressed to be turned on.

The projector 11 has a function to detect the leading edge position of the pen-type indicator 2, as described later, and outputs coordinate data indicating the coordinate of the position of the pen-type indicator 2 that is detected, to the PC 13. Further, the projector 11 has a function to detect that the switch 21 of the pen-type indicator 2 is turned on, and performs an action corresponding to ON/OFF of the switch 21, as described later. By this configuration, the projector 11 functions as an input device with respect to the PC 13. Further, the projector 11, the pen-type indicator 2 and the PC 13 constitute a display system 10. Further, the projector 11 is connected with the PC 13 through an USB cable and the like, and transmits the coordinate data of the position that is indicated by the pen-type indicator 2 and the operation data based on ON/OFF of the switch 21 and the like to the PC 13. In the embodiment, the range, in which the projector 11 can detect the operation by the pen-type indicator 2 or the position of the pen-type indicator 2, is set as an operation area, and the operation area is an actual projection area 11B which the projector 11 projects. In addition, the operation area may include an area outside of the actual projection area 11B which the projector 11 projects, as a detectable range.

Figure 2:
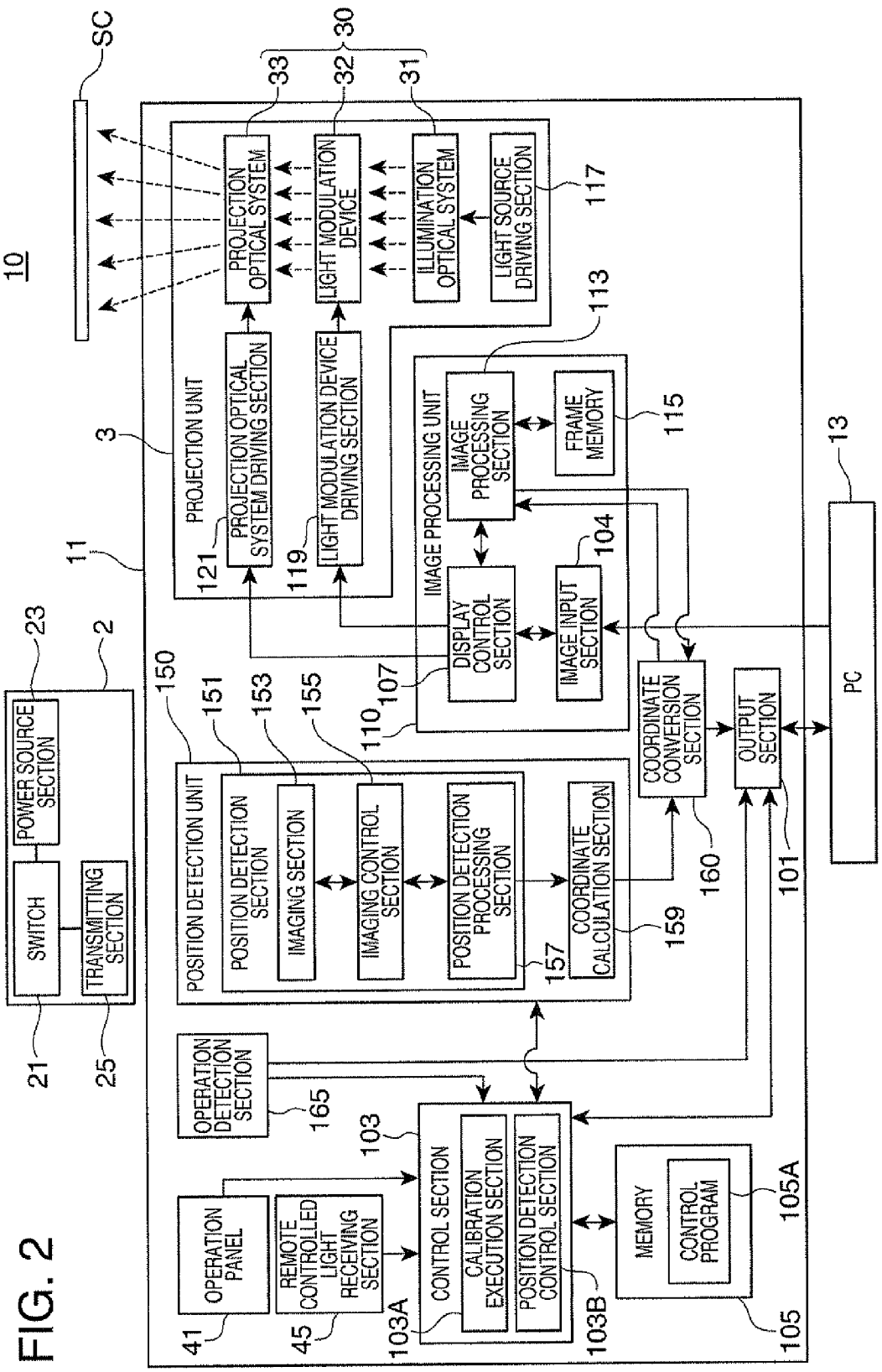
FIG. 2 is a block diagram illustrating a functional configuration of the display system.

FIG. 2 is a block diagram showing a functional configuration of the display system 10.

The projector 11 includes an image processing unit 110, a projection unit 3 (display section), a position detection unit 150, a coordinate conversion section 160, an output control section 101, and a control section 103 that controls each section. The image processing unit 110 performs an image processing for display, based on the image data that is input from the PC 13. The projection unit 3 projects an image to the screen SC according to the control of the image processing unit 110. The position detection unit 150 detects the indicated position of the pen-type indicator 2 on the screen SC. The coordinate conversion section 160 converts the coordinate of the indicated position that is detected by the position detection unit 150 into the coordinate in the image data. The output control section 101 outputs the coordinate after conversion, that is converted by the coordinate conversion section 160, to the PC 13.

The control section 103 is configured by a CPU, a non-volatile memory, a RAM and the like, which are not shown. The control section 103 reads and executes the control program 105A that is stored in the memory 105, and controls each section of the projector 11. The control section 103 functions as a calibration execution section 103A and a position detection control section 103B (operation notification section). The position detection control section 103B performs the calibration described later and obtains a corresponding relationship (a coordinate conversion parameter) between the coordinate of the captured image data and the coordinate of the area on the screen SC to be calibrated. The position detection control section 103B detects the indicated position that is indicated by the pen-type instructor 2 and ON/OFF of the switch 21, using the position detection unit 150 and the operation detection section 165 that are described later. The memory 105 is configured by a magneto optical recording device, and a semiconductor memory device, and stores various operation program including a control program 105A and data such as various set values.

An operation panel 41 that is disposed in the casing (not shown) of the projector 11 is connected to the control section 103. The control section 103 performs the lighting control of the indicator lamp of the operation panel 41 in response to an action state of the projector 11 and the like, and detects the operation of the switch of the operation panel 41. Further, projector 11 includes a remote controlled light receiving section 45 which receives an infrared signal that is transmitted in response to the operation of the user by the remote controller (not shown) that the user uses. The control section 103 determines the content of the operation by the user, based on the operation signal that the operation panel 41 or the remote controlled light receiving section 45 outputs and controls the projector 11.

The projection unit 3 includes a projection section 30 (projection section) that is configured by an illumination optical system 31, a light modulation device 32 (light modulation section), and a projection optical system 33. The illumination optical system 31 includes a light source that is configured by a xenon lamp, an extra high pressure mercury lamp, an LED (Light Emitting Diode) and the like. The illumination optical system 31 may include a reflector or an auxiliary reflector which induces the light emitted by the light source to the light modulation device 32. Further, the illumination optical system 31 may include a lens group (not shown) to enhance the optical property of the projection light, a polarizing plate, or a dimming element which lowers the light amount of the light emitted from the light source on the path reaching the light modulation device 32.

The light modulation device 32 receives the signal from the image processing unit 110 to modulate the light emitted by the illumination optical system 31. In the embodiment, the light modulation device 32 has three sheets of transmissive liquid crystal panels corresponding to three primary color of R, G, B. In this configuration, the light from the illumination optical system 31 is divided into the color lights of three colors of R, G, B, and each color light is incident on each corresponding liquid crystal panel. The color light, that is transmitted through each liquid crystal panel and modulated, is synthesized by the synthesis optical system such as a cross dichroic prism and emitted into the projection optical system 33.

The projection optical system 33 includes a zoom lens which performs a scaling and a focus adjustment of the image to be projected, a motor for zoom adjustment which adjusts the level of zoom, and a motor for focus adjustment which performs the focus adjustment.

Further, the projection unit 3 includes a projection optical system driving section 121, a light modulation device driving section 119 and a light source driving section 117. The projection optical system driving section 121 drives the projection section 30 and each motor that projection optical system 33 has, according to the control of the display control section 107. The light modulation device driving section 119 drives the light modulation device 32 to perform the drawing, based on the image signal that is output from the display control section 107. The light source driving section 117 drives the light source that the illumination optical system 31 has, according to the control of the control section 103.

The image processing unit 110 includes an image input section 104 that has an interface connected to the PC 13. As the interface of the image input section 104, for example, various general-purpose interfaces can be used. A specific example includes a DVI (Digital Visual Interface) interface to which a digital image signal is input, an USB interface and a LAN interface. Further, for example, it is possible to use an S image terminal to which a composite image signal such as a NTSC, a PAL and a SECAM is input, a RCA terminal to which a composite image signal is input, a D terminal to which a component image signal is input, a HDMI connector conforming to HDMI specification (a registered trademark), and the like. Further, the image input section 104 has an A/D conversion circuit which converts an analog image signal into digital image data, and may have a configuration that is connected to PC 13 by an analog image terminal such as a VGA terminal. In addition, the image input section 104 may transceive the image signal through wire communication, or may transceive the image signal through wireless communication. Further, the image input section 104 may have a configuration of having DisplayPort that is set by VESA (Video Electronics Standards Association). Specifically, the image input section 104 may have DisplayPort connector or Mini DisplayPort connector, and an interface circuit conforming to DisplayPort specification. In this case, the projector 11 can be connected to DisplayPort that the PC 13 or a portable device having the same function as the PC 13.

Further, the image processing unit 110 (image forming section) includes a display control section 107 which processes the input data that is input through the image input section 104. Further, the image processing unit 110 includes an image processing section 113 which develops the image into a frame memory 115, according to the control of the display control section 107, and forms an image that the projection section 30 projects.

The display control section 107 performs discrimination of the format (the frame rate, the resolution, and the compression state) of the image data that is input to the image input section 104, according to the control of the control section 103. Then, the display control section 107 determines necessary processings for displaying the display image in the light modulation device 32 and controls the image processing section 113 to perform the processings. The image processing section 113 develops the image data that is input to the image input section 104, into the frame memory 115, according to the control of the display control section 107. The image processing section 113 appropriately performs various conversion processings such as interlace/progressive conversion and resolution conversion with respect to the developed image data. Then, based on the image data after processing, the image processing section 113 forms an image signal having a predetermined format in order to display the display image that is drawn on the frame memory 115 and outputs the formed image signal to the display control section 107.

The image processing section 113 performs various image processings such as a keystone correction, a tone correction corresponding to a color mode and an image scaling processing, according to the control of the display control section 107. The display control section 107 outputs the image signal that is processed by the image processing section 113 to the light modulation device driving section 119, and causes the image signal to be displayed on the light modulation device 32. Further, the image processing section 113 derives image position information described later, from information such as a resolution and an aspect ratio of the image data being displayed, and the display size of the liquid crystal display panel of the light modulation device 32, and outputs the obtained image position information to the coordinate conversion section 160.

The position detection unit 150 (position detection section) includes an imaging section 153 that captures an image of the screen SC, and an imaging control section 155 that controls the imaging section 153. Further, the position detection unit 150 includes a position detection section 151 and a coordinate calculation section 159. The position detection section 151 detects the indicated position of pen-type indicator 2, based on the captured image of the imaging section 153. The coordinate calculation section 159 calculates the coordinate of the indicated position that is detected by the position detection section 151.

The imaging section 153 includes a camera which takes a picture of the image that the projection section 30 projects, and the maximum range (corresponding to the projectable area 11A described later) in which the projection section 30 can project the image on the screen SC, is included in the angle of view of the imaging section 153. The imaging section 153 captures an image according to the control of the imaging control section 155, outputs the captured image data.

The imaging control section 155 controls the imaging section 153 according to the control of the control section 103, and causes the imaging section 153 to capture an image, and acquires the captured image data that is output by the imaging section 153 and outputs the captured image data to the position detection processing section 157. The captured image data that is output from the imaging section 153 may be image data which is displayed in a format of RGB or YUV, or of which only the luminance component may be displayed. The imaging control section 155 may output the captured image data, as it is, that is output from the imaging section 153, to the position detection processing section 157, or may output the captured image data to the position detection processing section 157 after performing a resolution adjustment or a conversion into a predetermined file format (JPEG, BMP, and the like) with respect to the captured image data. When the imaging section 153 has a zoom magnification adjustment mechanism, a focus adjustment mechanism, and an aperture adjustment mechanism when the image is captured, the imaging control section 155 controls these mechanisms to perform an imaging under the preset condition.

In addition, the imaging section 153 is not limited to a configuration capable of forming an image of the visible light, but may have a configuration capable of forming an image of the invisible light (an infrared light, etc.). In this case, a configuration can be employed in which the pen-type indicator 2 emits the invisible light and imaging section 153 forms an image of the invisible light. Further, a configuration can be employed in which the pen-type indicator 2 has a reflection section capable of reflecting the invisible light, the projector 11 projects the invisible light toward the screen SC according to the control of the control section 103, and the imaging section 153 forms an image of the invisible light that is reflected on the reflection section of the pen-type indicator 2.

The position detection processing section 157 analyses the captured image data that is input from the imaging control section 155, extracts, from the captured image data, a boundary between the outside of an actual projection area 11B and the actual projection area 11B, and the image of the pen-type indicator 2, and specifies the indicated position by the pen-type indicator 2. The indicated position of the pen-type indicator 2 is obtained, for example, as the position of the leading edge of the pen-type indicator 2. The indicated position that is specified by the position detection processing section 157 is the position in the captured image data, and the coordinate calculation section 159 converts the specified indicated position into the coordinate on the frame memory 115 that is drawn by the image processing section 113. The coordinate on the image that is drawn on the frame memory 115 and the coordinate on the captured image data are affected by various factors. These factors are, for example, a distance between the projector 11 and the screen SC, a zoom ratio in the projection optical system 33, an install angle of the projector 11, a distance between the imaging device 5 and the screen SC, and the like. The projector 11 firstly performs a calibration and obtains the corresponding relationship (a coordinate conversion parameter) between the coordinate on the image that is drawn by the image processing section 113 and the coordinate on the screen SC. The coordinate calculation section 159, based on the coordinate conversion parameter that is obtained by the calibration, converts the coordinate on the captured image data into the coordinate on the frame memory 115. The coordinate that is converted by the coordinate calculation section 159 is output to the coordinate conversion section 160.

The coordinate conversion section 160 converts the coordinate that is output by the position detection unit 150 into the coordinate on the image that is input from the PC 13. The coordinate conversion section 160 obtains various information including the resolution of the image that is developed in the frame memory 115 by the image processing section 113 and information relating to the content of the processing such as a resolution conversion or zoom that is performed when the image processing section 113 develops the image. Then, the coordinate conversion section 160 converts the obtained information and the coordinate that is obtained by the position detection processing section 157 into coordinate data indicating the coordinate on the input image data. The coordinate data that is converted by the coordinate conversion section 160 can be output to the output control section 101 and the image processing section 113. The output destination to which the coordinate conversion section 160 outputs the coordinate data is controlled by the function of the position detection control section 103B.

Figure 3:
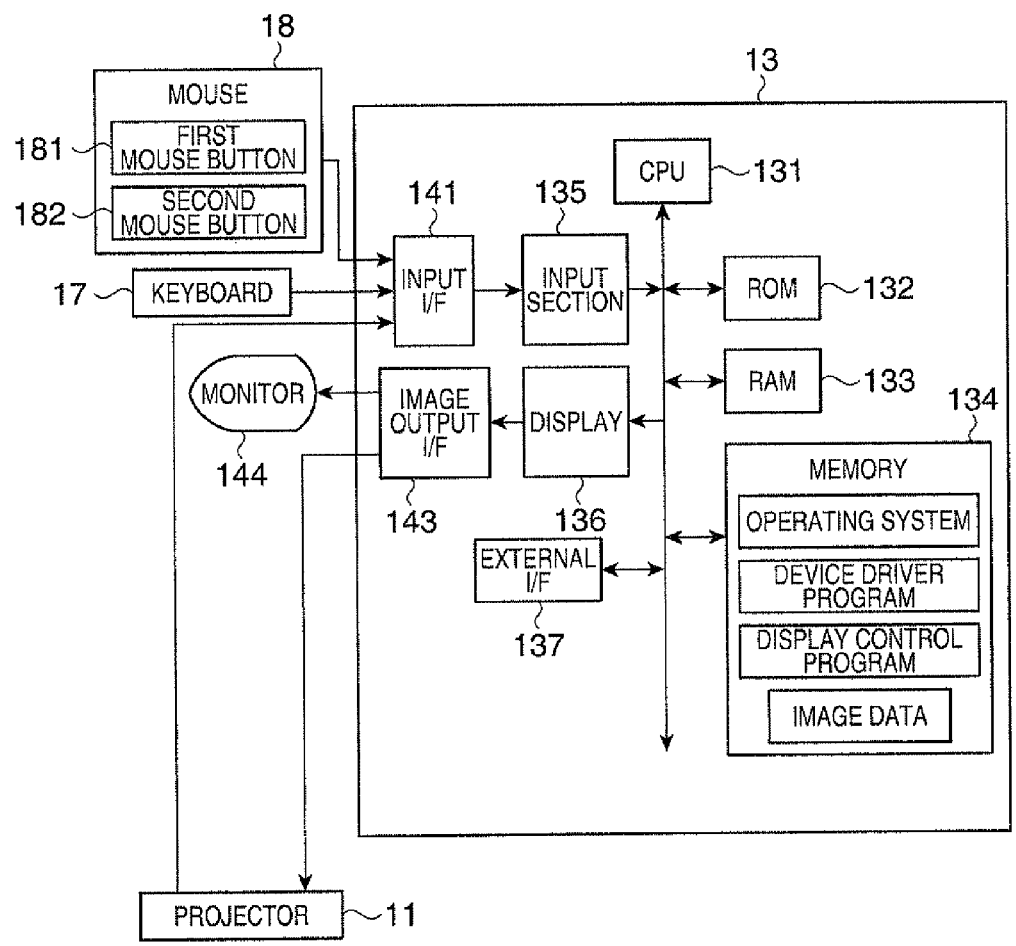
FIG. 3 is a block diagram illustrating a functional configuration of a PC.

The PC 13 can process the coordinate data that is output by the coordinate conversion section 160, similarly to the data that is input in response to the operation of the pointing device such as a mouse 18 (FIG. 3). That is because a conversion into the data indicating the coordinate on the image that is output by the PC 13 is performed by the coordinate conversion section 160. For this reason, the display system 10 including the projector 11 functions similarly to the configuration in which an input to the PC 13 is directly performed by the mouse 18 and the like.

The projector 11 includes an operation detection section 165 (operation detection section) which detects the operation state of the switch 21 of the pen-type indicator 2. As shown in FIG. 2, the pen-type indicator 2 includes a power source section 23, and a transmitting section 25 which transmits a wireless signal based on the power of the power source section 23. When the switch 21 is turned on, the transmitting section 25 transmits the data indicating the ON state of the switch 21 as the wireless signal using an infrared radio wave or a wireless radio wave. Further, the transmitting section 25 corresponds to the transmitting unit according to the invention. The operation detection section 165 receives the wireless signal that is transmitted by the transmitting section 25 using infrared or wireless radio waves to detect ON/OFF of the switch 21. The operation state of the switch 21 that is detected by the operation detection section 165 is input to the output control section 101 and the control section 103 through the output control section 101. The control section 103 determines ON/OFF of the switch 21, using the function of the position detection control section 103B, based on the detection state of the operation detection section 165, and outputs the operation data to the PC 13, as described later referring to FIG. 5.

The output control section 101 includes an interface connected to the PC 13. Examples of the interface includes a general-purpose interface such as an USB interface, a wire LAN interface, a wireless LAN interface and an IEEE 1394. After the conversion processing is performed by the coordinate conversion section 160, the output control section 101 outputs the coordinate data to the PC 13, according to the control of the control section 103. The coordinate data is input to the PC 13, similarly to the coordinate data that is output by a pointing device such as the mouse 18 (FIG. 3), a trackball, a digitizer, and a pen tablet. Further, the output control section 101 outputs the operation data that is generated by the position detection control section 103B to the PC 13. The operation data is data having the same format as the data to be output to the PC 13 by the operation of the mouse 18, when the first mouse button (so-called, a right button) 181 or the second mouse button (so-called, a left button) 182 of the mouse 18 is operated.

FIG. 3 is a block diagram illustrating the functional configuration of the PC 13.

As shown in FIG. 3, the PC 13 includes a CPU 131 which executes a control program to centrally control each section of the PC 13. Further, the PC 13 includes a ROM 132 in which a basic control program to be executed by the CPU 131 and the data relating to the program is stored, and a RAM 133 in which a program to be executed by the CPU 131 and the data is temporarily stored. In addition, the PC 13 includes a memory 134, an input section 135, a display 136 and an external I/F 137, and these sections are respectively connected with each other through a bus. The external I/F 137 transceives data and the like between external devices and the PC 13.

The memory 134 stores various programs and data in a non-volatile manner. Specifically, the memory 134 stores an OS (operating system) executed by the CPU 131, a device driver program, a display control program, and image data to be output when the display control program is executed. The CPU 131 executes the operating system and realizes a basic function of the PC 13. Then, the CPU 131 executes a device driver program constituting a part of the operating system and enables an input from the input device including a keyboard 17 and the mouse 18 that are connected to an input I/F 141 that will be described later. Further, the CPU 131 executes the display control program to execute a function to display the image data on the monitor 144. When the function is executed, the image is output to the monitor 144 and the projector 11. Here, the CPU 131 corresponds to the control unit according to the invention.

The input section 135 detects the input operation and outputs the data indicating the input content or an operation signal to the CPU 131. The input section 135 has an input I/F 141 having a connector and a power supply circuit. An input device such as a keyboard 17 and the mouse 18 is connected to the input I/F 141. The input I/F 141 is configured by a general-purpose interface for an input device such as an USB interface. An operation signal corresponding to the key that is operated, is input from the keyboard 17 to the input I/F 141. Further, from the mouse 18, relative coordinate data or absolute coordinate data corresponding to the operation to move the mouse 18, and data indicating the operation state of the first mouse button 181 (a first operator) and the second mouse button 182 (a second operator) of the mouse 18 are input. Further, a communication cable linked to the projector 11 is connected to the input I/F 141, and the coordinate data of the indicated position by the pen-type indicator 2 is input from the projector 11. From the projector 11, the absolute coordinate data to be input in response to the operation of the general-purpose pointing device and the operation data in response to the operation state of the switch 21 are input. Those data are input as the same data as the coordinate data that is output by the pointing device such as the mouse 18, the trackball, the digitizer, and the pen tablet. The PC 13 can process the coordinate data that is input from the projector 11 using a general-purpose device driver program corresponding to various pointing devices. The PC 13 performs an action to move a mouse cursor or a pointer, and the like, for example, based on the coordinate data.

The display 136 outputs display data for displaying a processing result and the like by the CPU 131. The display 136 has an image output I/F 143 including a connector for an image signal output, and the monitor 144 and the image signal cable (not shown) linked to the projector 11 are connected to the image output I/F 143. The image output I/F 143 includes, for example, a VGA terminal for outputting an analog image signal, a DVI interface for outputting a digital image signal, an USB interface, a LAN interface, or the like. Further, for example, the image output I/F 143 may include an S image terminal for outputting a composite image signal such as an NTSC, a PAL, a SECAM, and a RCA terminal for outputting a composite image signal, and a D terminal for outputting a component image signal. Further, the image output I/F 143 may include a HDMI connector conforming to HDMI specification (a registered trademark), and the like. The image output I/F 143 includes a plurality of connectors, and the monitor 144 and the projector 11 are respectively connected to any one of connectors. Further, the image output I/F 143 may have a configuration of having DisplayPort that is set by VESA. Specifically, the image output I/F 143 may have a configuration having DisplayPort connector or Mini DisplayPort connector, and an interface circuit conforming to DisplayPort specification. In this case, the PC 13 can output a digital image signal to the projector 11, the monitor 144 or other apparatuses through DisplayPort. In addition, the image output I/F 143 may transceive the image signal through a wire communication or transceive the image signal through a wireless communication.

During the execution of the display control program, when the coordinate data or the operation data corresponding to the operation of the pointing device is input from the input section 135, the CPU 131 generates an image for displaying a pointer 12 (FIG. 1) in the position corresponding to the input coordinate. Then, the CPU 131 generates an image data in which the pointer 12 is superimposed to the image data being reproduced, and outputs the image data from the image output I/F 143 to the projector 11.

Figure 4A:
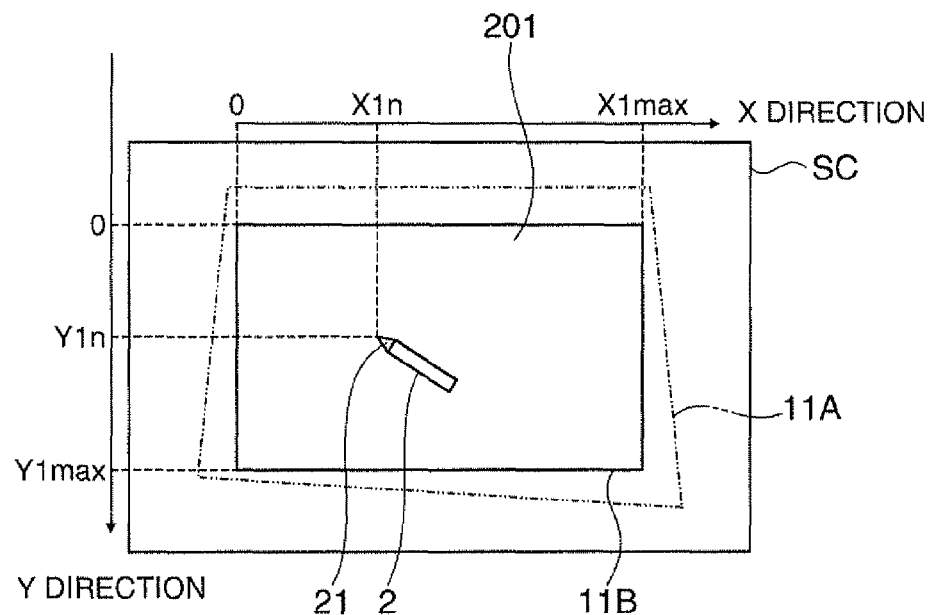
FIGS. 4A and 4B are explanatory views illustrating a processing to detect and convert coordinate.
Figure 4B:
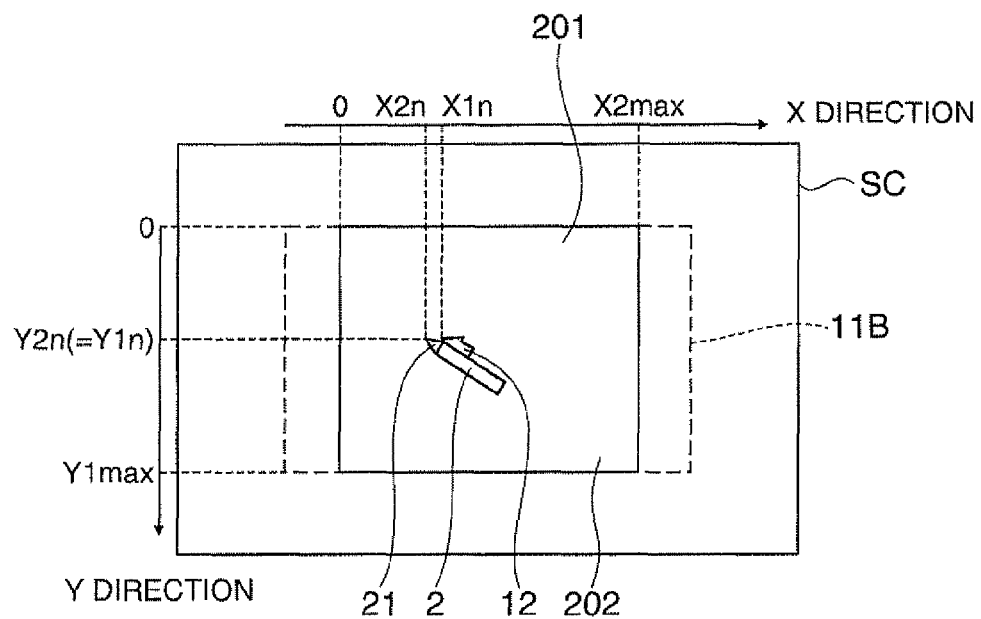

FIGS. 4A and 4B are an explanatory views illustrating a processing to detect and convert the coordinate, FIG. 4A shows an example of the projection state and FIG. 4B shows an example of a case where the image is changed.

When the display image is projected, using the entire liquid crystal display panel that the light modulation device 32 has, the image is formed in the projectable area 11A shown by a two-dot chain line in FIG. 4A. Except for a case where the projector 11 is located in front of the screen SC, since a keystone distortion occurs in the projectable area 11A as shown in FIG. 4A, the projector 11 performs the keystone correction using the function of the display control section 107. After the keystone correction is performed, the area to which the image is projected becomes an actual projection area 11B which is set to have a rectangle shape and the maximum size on the screen SC. In addition, the size of the actual projection area 11B is determined by the resolution of the liquid crystal display panel of the light modulation device 32 and the degree of the keystone distortion, but the size may not be the maximum size.

The calibration execution section 103A performs the above described calibration in the actual projection area 11B after the keystone correction is performed. First, the calibration execution section 103A controls the image processing section 113 and draws a predetermined image for calibration on the frame memory 115, so that the image for calibration is projected to the screen SC. Next, in a state where the image for calibration is projected to the screen SC, by the control of the calibration execution section 103A, the position detection unit 150 captures an image of the screen SC. The image for calibration may be, for example, an image in which dots are arranged on a white background, the image that is previously stored in the memory 105 and the like may be used. Otherwise, the calibration execution section 103A may generate the image for calibration for each calibration.

The calibration execution section 103A detects, from the captured image data, dots arranged in the boundary between the outside of the actual projection area 11B and the actual projection area 11B, and the image for calibration, and specifies the position in the captured image data. That is, the calibration execution section 103A specifies the corresponding relationship among the imaging range (angle of view) of the position detection unit 150, the position on the actual projection area 11B of the screen SC, and the position on the image that the image processing section 113 draws on the frame memory 115. Based on the corresponding relationship specified by the processing, the calibration execution section 103A obtains the coordinate conversion parameter that is used by the coordinate calculation section 159. The coordinate calculation section 159 performs the coordinate calculation processing based on the coordinate conversion parameter, and converts the coordinate on the captured image data into the coordinate on the image drawn by the image processing section 113. Then, the coordinate that is converted by the coordinate calculation section 159 is output to the coordinate conversion section 160, and converted into the coordinate among the image data that is output by the PC 13, by the coordinate conversion section 160. A description of the conversion processing will be made.

In an example of FIG. 4A, the resolution of the actual projection area 11B is 1280×800 dot, the resolution of the image data that is input from the PC 13 is also 1280×800 dot, and the display image 201 of 1280×800 dot is displayed.

As shown in FIG. 4A, the position detection processing section 157 virtually sets X-Y Cartesian coordinate system in which the upper left corner of the actual projection area 11B is the origin, the right direction is X-axis direction, and the downward direction is Y-axis direction, and obtains the coordinate (X1n, Y1n) of the indicated position of the pen-type indicator 2. Further, the edge position of X direction of the display image 201 is X1max, and the edge position of Y direction of the display image 201 is Y1max.

Here, for example, it is assumed a case where the image data that is input from the PC 13 is converted into the display image 202 of resolution 1024×768 dot. In this case, as shown in FIG. 4B, the display image 202 of 1066×800 dot is projected. The resolution of the display image 202 is lower than the resolution of the display image 201, so that the area to which the display image 202 is projected is smaller than the actual projection area 115.

In this case, if the display image 201 on the screen SC is converted into the display image 202 without moving the pen-type indicator 2 on the screen SC, even if the pen-type indicator 2 stops, the relative position between the indicated position and the image changes. That is because the positions of the origin and the sizes are different on the display image 201 and the display image 202. Therefore, the coordinate (X1n, Y1n) (FIG. 4A) obtained by the coordinate calculation section 159 and the coordinate (X2n, Y2n) (FIG. 4B) of the indicated position in the display image 202 are not coincident. For example, if the pointer 12 is displayed in the position of the coordinate (X1n, Y1n), as shown in FIG. 45, the pointer 12 is shifted from the indicated position of the pen-type indicator 2. Although the shift is eliminated by performing calibration after the display image 201 is converted into the display image 202, since the number of calibration increases and the calibration is complicated, so the user has to wait during calibration.

Therefore, the coordinate calculation section 159 calculates the coordinate of the indicating position in the actual projection area 11B, and the coordinate conversion section 160 converts the coordinate into the coordinate of the indicating position on the display image being displayed, so that the projector 11 outputs the correct coordinate irrespective of the resolution of the display image.

Next, the coordinate conversion section 160 acquires the image position information from the image processing section 113. The image position information includes at least the coordinate of the display position of the display image 202 after the conversion is performed in the actual projection area 11B, and the display size of the display image 202 (the coordinate of the edge position of the display image 202). The coordinate conversion section 160 converts, based on the acquired image position information, the coordinate obtained by the coordinate calculation section 159 into the coordinate in which the corner of the display image 202 is the origin. By this conversion, even if the size of the display image changes, without performing calibration, it is possible to correctly obtain the coordinate of the indicated position in the displayed image.

The image position information that the coordinate conversion section 160 uses in converting is affected by the resolution and the display position of the display image, so that the image position information may change due to the change in these conditions. For example, there may be a case where a processing to change the projection state is performed, such as the change in the display resolution, the change in the aspect ratio, zoom, the change (movement) in the display position of the image, the multi-screen display processing, and the like, and a case where the resolution of the image data that the PC 13 outputs to the projector 11 changes. When the event or the processing occurs in which the image position information changes, the calibration execution section 103A updates the image position information and the coordinate conversion section 160 converts the coordinate, based on the updated image position information. Therefore, the projector 11 can output the coordinate of the correct indicated position that is converted according to the latest state of the display image. Further, the calibration execution section 103A performs the calibration as necessary, and specifies the correlation between the position in the actual projection area 11B and the position of the input image data. Specifically, the calibration is performed, when keystone correction is performed in following cases: a case where the install condition of the projector 11 changes, a case where the optical condition changes, or the like. For this reason, more accurate coordinate of the indicated position can be output.

The projector 11 detects the operation of the pen-type instructor 2 using the operation detection section 165, and outputs the operation data that the PC 13 can process in a general-purpose device driver program similarly to the mouse 18 (FIG. 3), in response to ON/OFF of the switch 21.

The mouse 18 includes two operators of a first mouse button 181 and a second mouse button 182. When the first mouse button 181 is pressed, the operation data indicating the press operation of the first mouse button 181 is input to the PC 13, and if the press of the first mouse button 181 is released, the operation data indicating the release operation of the first mouse button 181 is input to the PC 13. Similarly to the above, in the second mouse button 182, the operation data of press the operation/the release operation is input to the PC 13 by the press operation/the release of the press operation.

The projector 11 outputs the operation data corresponding to the operation data of the first mouse button 181 and the second mouse button 182 that is input to the PC 13 from the mouse 18, according to ON/OFF of one switch 21 of the pen-type indicator 2. Hereinafter, a detailed description of the action will be made.

Figure 5:
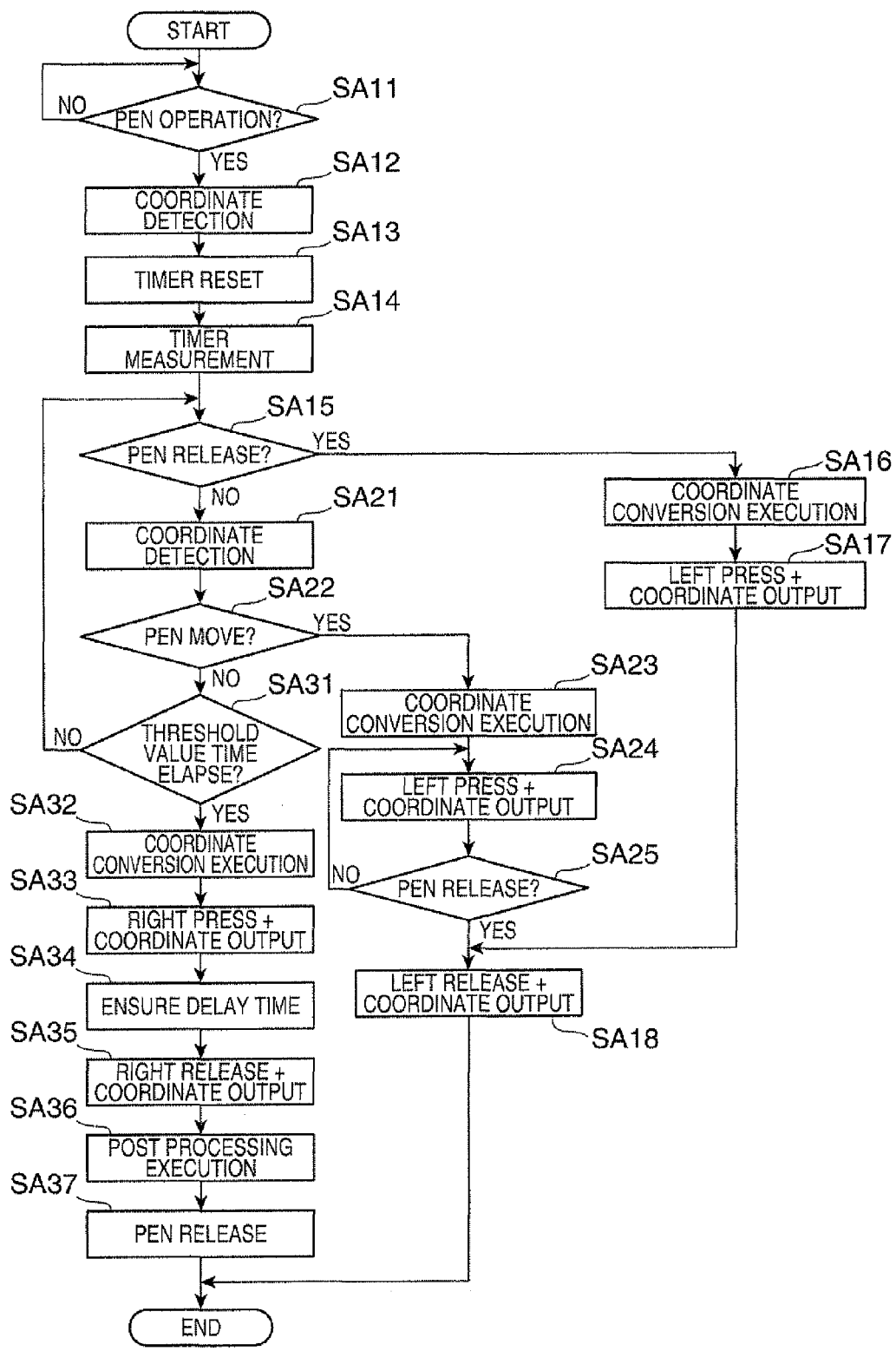
FIG. 5 is a flow chart illustrating an action of the projector.

FIG. 5 is a flow chart illustrating the action of the projector 11.

In the embodiment, among input operations using the pen-type indicator 2, the operation to turn the switch 21 ON corresponds to the "first input operation" according to the invention and the operation to turn the switch 21 OFF corresponds to the "second input operation" according to the invention. That is, if the user performs the operation to press the pen-type indicator 2 to the screen (the press operation) to turn the switch 21 ON, the operation is detected as the first input operation. In this state, if the user performs the operation to release the pen-type indicator 2 from the screen to turn the switch 21 OFF, the second input operation is detected.

The data that the projector 11 outputs to the PC 13 corresponding to the first and second input operations corresponds to "the first operation", "the release of first operation", "the second operation", and "the release of second operation" according to the invention. The first operation is the press operation of the first mouse button 181 (the first operator) that is the right button of the mouse. The release of first operation is the release operation of the first mouse button 181 (the first operator). Further, the second operation is the press operation of the second mouse button 182 (the second operator) that is the left button of the mouse. The release of the second operation is the release operation of the second mouse button 182. For example, the action in which the projector 11 outputs data indicating release of the first mouse button 181 to the PC 13, corresponds to the action to notify the release of the first operation.

In addition, some preset values are used in an action described later, but these values are previously input by the operation of a remote controller (not shown) or an operation panel 41, or these values are input at the time of the factory shipment and stored in the memory 105.

When the projector 11 executes a normal action, the position detection control section 103B waits for the (press) operation to press the pen-type indicator 2 to the screen SC (Step SA11). That is, the position detection control section 103B waits during the time when the switch 21 of the pen-type indicator 2 is not turned ON (Step SA11; No). If it is detected by the operation detection section 165 that the switch 21 is turned ON (Step SA11; Yes), the position detection control section 103B detects the coordinate of the leading edge position of the pen-type indicator 2 using the position detection unit 150 (Step SA12).

The position detection control section 103B resets the count value of the built-in timer (not shown) (Step SA13), and starts the measurement using the timer (Step SA14). The position detection control section 103B determines whether it is detected that the pen-type indicator 2 is released from the screen SC and the switch 21 is turned OFF (Step SA15). In a case where it is detected that the switch 21 is turned OFF (Step SA15; Yes), the position detection control section 103B performs a processing to convert the position coordinate that is detected in Step SA12, using the coordinate conversion section 160 (Step SA16). Subsequently, the position detection control section 103B generates operation data corresponding to the press operation of the second mouse button 182 (the left button) of the mouse 18, and outputs the operation data and the coordinate data after conversion to the PC 13 (Step SA17). In addition, the position detection control section 103B generates operation data indicating the release operation of the second mouse button 182, and outputs the operation data and the coordinate data that is converted by the coordinate conversion section 160, to the PC 13 (Step SA18) and completes the processing.

By these actions of Steps SA11 to SA18, in a case where the pen-type instructor 2 is released within a predetermined time after the pen-type indicator 2 is pressed, the operation data indicating the operation (that is, corresponding to left click) to press and release the second mouse button 182 of the mouse 18 is output to the PC 13.

On the other hand, in a case where the release operation of the pen-type indicator 2 (the second input operation) is not detected (Step SA15; No), the position detection control section 103B detects the coordinate of the leading edge position of the pen-type instructor 2 using the position detection unit 150 (Step SA21). The position detection control section 103B determines, based on the detected position coordinate and the coordinate detected in Step SA12, whether the pen-type indicator 2 moves beyond a predetermined threshold value relating to a move distance (Step SA22). In short, in a case where the move distance after the switch 21 is turned ON, that is, after the processing in FIG. 5 is started, exceeds the predetermined threshold value, it is determined that the pen-type instructor 2 moves in the state where the switch 21 is turned ON.

In a case where it is determined that the pen-type indicator 2 moves (Step SA22; yes), the position detection control section 103B converts the coordinate detected in Step SA21, using the coordinate conversion section 160 (Step SA23). Subsequently, the coordinate data and the operation data indicating the press operation of the second mouse button 182 (the left button) are output to the PC 13 (Step SA24). In Step SA24, the position detection control section 103B outputs data at least two times. First, the position detection control section 103B outputs the coordinate data indicating the coordinate of the initial indicated position that is detected in Step SA12 and the operation data indicating the press operation of the second mouse button 182. Next, the position detection control section 103B outputs the coordinate data indicating the coordinate that is detected in Step SA21 and the operation data indicating the press operation of the second mouse button 182. By outputting the data a plurality of times, the PC 13 can acquire the coordinate before and after the move of the pen-type indicator 2. Further, based on the plurality of times of data output, the PC 13 can identify that the second mouse button 182 remains in the state of being pressed during the move. Therefore, in a case where an input operation is performed to move the pen-type indicator 2 while keeping the switch 21 turned on, the PC 13 detects the drag operation using the mouse 18.

Here, the position detection control section 103B detects whether the release operation (the second input operation) of the pen-type indicator 2 is detected (Step SA25). When the release operation of the pen-type indicator 2 is not detected (Step SA25; No), the process returns to Step SA24, and the coordinate data and the operation data are repeatedly output. In this case, the projector 11 repeatedly (continuously) outputs the operation data indicating the press operation of the second mouse button 182 and the coordinate data. Further, in a case where the process returns to Step SA24 from Step SA25 and performs Step SA24 multiple times, the position detection control section 103B outputs the coordinate data after move and the operation data in Step SA24. That is, in a case where continuously outputting the data of Step SA24, after the second time, the coordinate data that is detected in Step SA12 is not output. Further, in the process to return to Step SA24 from Step SA25, the position detection control section 103B may detect the coordinate of the leading edge position of the pen-type instructor 2 using the position detection unit 150, and output the detected coordinate data and the operation data in Step SA24. In this case, after it is determined in Step SA22 that the indicated position of the pen-type indicator 2 is moved, even if the indicated position is further moved, the coordinate data can be output to the PC 13 according to the move of the indicated position.

On the other hand, in a case where it is detected that the pen-type indicator 2 is released (Step SA25; Yes), the position detection control section 103B generates the operation data indicating the release operation of the second mouse button 182 and moves to Step SA18. In Step SA18, the position detection control section 103B outputs the operation data indicating the press operation of the second mouse button 182 and the coordinate data after conversion to the PC 13, and terminates the processing.

By the action of Step SA22 to SA25 and SA18, corresponding to the operation to move after the pen-type indicator 2 is pressed, the operation data corresponding to the drag operation of the mouse 18 is output to the PC 13.

In addition, when it is determined that the pen-type indicator 2 does not move beyond the predetermined threshold value (Step SA22; No), the position detection control section 103B determines whether the count value of the timer exceeds the threshold value of a preset time (Step SA31). Here, when the count value of the timer does not exceed the threshold value (Step SA31; No), the position detection control section 103B returns to Step SA15.

When the count value of the timer exceeds the threshold value (Step SA31; Yes), the position detection control section 103B converts the coordinate detected in Step SA21 using the coordinate conversion section 160 (Step SA32). The position detection control section 103B generates the operation data corresponding to the press operation of the first mouse button 181 (the right button) and outputs the operation data and the coordinate data after conversion to the PC 13 (Step SA33). That is, if ON state of the switch 21 of the pen-type indicator 2 lasts a predetermined time or more, the press operation of the first mouse button 181 is notified to the PC 13.

Then, the position detection control section 103B waits during a preset time (a delay time) (step SA34). In Step SA34, the position detection control section 103B ensures time not to output data indicating an operation to the PC 13 after data is output to the PC 13 in Step SA33. After the delay time elapses, the position detection control section 103B outputs the operation data indicating the release operation of the first mouse button 181 and the coordinate data that is converted in Step SA32 to the PC 13 (Step SA35). In Step SA35, before the release of the switch 21 is detected (before the second input operation is detected), the operation data indicating the release of the first mouse button 181 is output. For this reason, in a state where the pen-type indicator 2 is pressed and the switch 21 is turned ON, the PC 13 performs the processing corresponding to the press and the release of the first mouse button 181 (that is, corresponding to the right click). For example, the PC 13 displays the context menu, switches the window corresponding to the indicated position of the pen-type instructor 2 in an operating system employing a window system, into an active display, or switches the icon display state into the selected state. In this manner, if the display state of the PC 13 is changed, the image to be projected to the screen SC is changed in the same manner. Therefore, before the user releases the switch 21 of the pen-type indicator 2 (performs the second input operation), it is possible to know from the change in the image on the screen SC that the input operation of the user is notified as the click operation of the first mouse button 181.

Further, the delay time is set to cause the processing to be waited in Step SA34, thereby preventing the operation data indicating the press operation of the first mouse button 181 and the operation data indicating the release operation of the first mouse button 181 from being successively output to the PC 13 in a short time. In other words, for this reason, the operation data indicating the press operation of the first mouse button 181 and the operation data indicating the release operation of the first mouse button 181 are input at an interval to the PC 13. For this reason, there is an advantage that using an application program that the PC 13 executes, the successive operation data is surely obtained, and the press operation and the release operation of the first mouse button 181 are surely recognized.

In addition, after the delay time of Step SA34 elapses, the position detection control section 103B may detect the coordinate of the leading edge position of the pen-type instructor 2, convert the detected coordinate, and output the coordinate to the PC 13 in Step SA35. In this case, when the leading edge of the pen-type instructor 2 moves within the range not to exceed the threshold value that is used in the determination of Step SA22, the small move can be notified to the PC 13.

Subsequently, until the time when the switch 21 is turned off or when the position of the leading edge of the pen-type indicator 2 is moved to the outside of the detection range of the position detection unit 150 (outside an operation area), the control section 103 performs the processing not to output the operation data to the PC 13 (the post processing) (Step SA36). Then, if the release operation of the pen-type instructor 2 (the second input operation) is performed and the switch 21 is turned off (Step SA37), the processing is terminated.

The processing to be performed as the post processing is not particularly limited. For example, the processing includes a configuration that during the post processing, even if the control section 103 detects the move of the pen-type instructor 2 using the position detection unit 150, the control section 103 ignores the change in the coordinate and does not output the coordinate to the PC 13.

Figure 6:
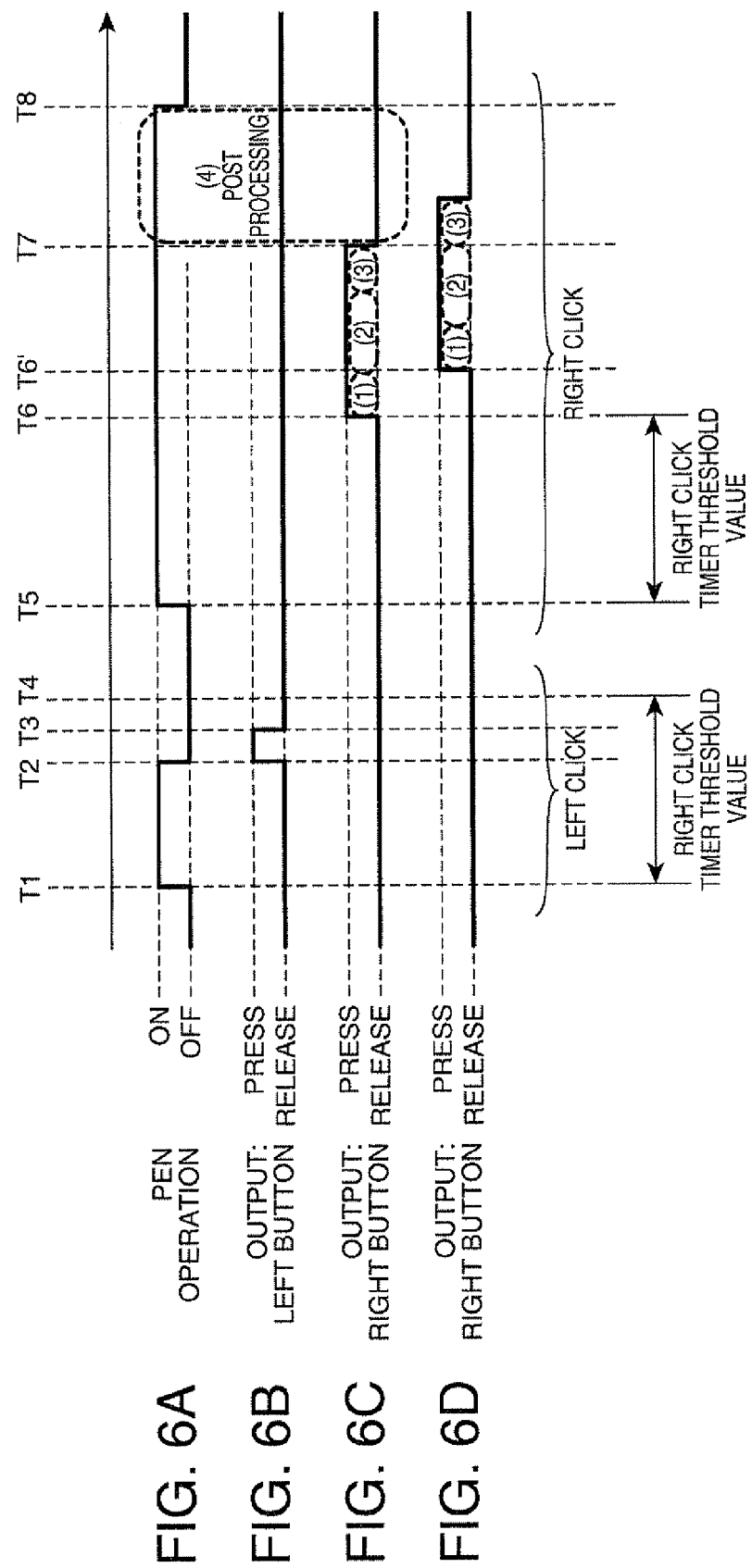
FIGS. 6A to 6D are timing charts illustrating correlation between the operation of a pen-type indicator and operation data that is output by the projector.

FIGS. 6A to 6D are timing charts illustrating an example of correlation between the operation of the pen-type indicator 2 and the operation data that the projector 11 outputs. FIG. 6A illustrates the operation state of the pen-type indicator 2, that is, ON/OFF state of the switch 21, and FIG. 6B illustrates the operation data of the second mouse button 182 that the projector 11 outputs. Further, FIG. 6C illustrates the operation data of the first mouse button 181 that the projector 11 outputs, and FIG. 6D illustrates another example of the operation data of the first mouse button 181 that the projector 11 outputs.

First, an example is given in which the operation (the first input operation) of the pen-type indicator 2 starts at the time T1, the switch 21 is turned ON, the release of the operation (the second input operation) is detected at the time T2 and the switch 21 is turned OFF. If the timing (time T2) at which it is detected that the switch 21 is turned OFF, is prior to the timing (time T4) at which the threshold value of the timer, that detects the right click, elapses, the operation data indicating the press operation of the second mouse button 182 is output (corresponds to Step SA17). The operation data is output at time T2 at which OFF of the switch 21 is detected. The timing (time T3) at which the output of the operation data is completed is determined by the transmission speed, the data format, and the like, but is not limited by the threshold value of the timer, and the like. After the operation data of the press operation of the second mouse button 182 is output and a predetermined time elapses, the operation data indicating the release operation (the release of the second operation) of the second mouse button 182 is output (corresponding to Step SA18).

Next, an example is given in which after the operation that the switch 21 of the pen-type indicator 2 is turned ON is detected and then the threshold value of the timer is exceeded, ON of the switch 21 is not detected. In FIG. 6A, from when ON of the switch 21 is detected at time T5, to time T6 when the threshold value of the timer, that detects the right click, elapses, in a case where OFF of the switch 21 is not detected, the press operation of the first mouse button 181 is notified later than time T6.

The notification includes three steps of actions as shown in (1) to (3) in FIG. 6O. That is, (1) The operation data of the press operation of the first mouse button 181 is output at time T6 (Step SA33), (2) The processing is waited during the delay time (Step SA34), (3) The operation data of the release operation of the first mouse button 181 is output (Step SA35). The timing (time T7) at which the output of the operation data is completed is determined by the transmission speed as above.

The notification actions (1) to (3) may be performed later than the timing T6 when the threshold value of the timer elapses, or may not start from the time T6. For example, as shown in FIG. 6D, the notification actions (1) to (3) may start from the time later than time T6 (for example, time T6').

Further, the control section 103 performs (4) post processing during the time until OFF of the switch 21 is detected (corresponding to Step SA36). The above notification actions (1) to (3) may be performed later than time T8 at which the post processing is completed.

In this manner, the projector 11 outputs, based on ON/OFF state of the switch 21 that is one operator, the operation data corresponding to the operation and the operation release of the first mouse button 181 and the second mouse button 182 that are two operators, and notifies the PC 13 of the operation.

As described above, the projector 11 relating to the embodiment to which the invention is applied, includes an operation detection section 165 which detects an input operation that is performed by the pen-type indicator 2, a position detection unit 150 which detects the operation position of the input operation in an operation area in which the operation detection section 165 can detect the input operation, and a position detection control section 103B which notifies the first operation and the operation position that is detected by the position detection unit 150, in a case where a second input operation is not detected within a predetermined time after a first input operation is detected by the operation detection section 165. The projector 11 notifies a particular operation using the time from when the first input operation is performed until when the second input operation is performed. For example, using the time from when the operation (the first input operation) to turn ON the switch 21 of the pen-type indicator 2 is detected until when the operation (the first input operation) to turn OFF the switch 21 of the pen-type indicator 2 is performed, the operation data indicating the press operation and the release operation of the first mouse button 181 or the operation data indicating the press operation and the release operation of the second mouse button 182 is output to the PC 13. As a more specific example, in a case where the operation to turn OFF the switch 21 is not detected within a predetermined time after the operation to turn ON the switch 21 is detected, the operation data indicating the press operation (the first operation) of the first mouse button 181 is output to PC 13.

In this manner, the operation data indicating the press operation and the release operation of the first mouse button 181 can be output only by performing one type of operation relating to ON/OFF of the switch 21 using the pen-type indicator 2. For this reason, by the input device such as the pen-type indicator 2 with which only relatively simple operation can be performed, for example, a certain operation and the release of the operation which correspond to the click operation of the first mouse button 181 and the second mouse button 182 can be notified, thus it is possible to achieve operability close to more multifunctional pointing device using an input device having a simple configuration.

Then, as shown in the embodiment, since the operation signal or the operation data indicating the operation of a usual pointing device such as the mouse 18 is output, the input device can perform the same operation as the pointing device, or the input device can be used as an input device of a general computer such as the PC 13.

Further, in a case where the operation data indicating the press operation of the first mouse button 181 is output, before the operation to turn OFF the switch 21 is detected, the operation data indicating the release operation of the first mouse button 181 may be output. In this case, the PC 13 that is a notification target device may perform the processing corresponding to the release of the first mouse button 181. Actually, since the processing corresponding to the release operation of the first mouse button 181 is performed before the switch 21 of the pen-type indicator 2 is turned OFF, the user can know that the operation of the first mouse button 181 is notified to the PC 13.

Further, if the release operation of the pen-type indicator 2 is performed within a predetermined time, the operation data of the first mouse button 181 is not output and the operation data of the second mouse button 182 is output, thus it is possible to achieve operability such as the mouse 18 having a plurality of operators using the pen-type indicator 2.

Further, after the operation data of the press operation of the first mouse button 181 is output and a predetermined time elapses, the operation data of the release operation of the first mouse button 181 may be output.

Then, the projector 11 includes the projection unit 3 which displays an image that is input from the PC 13 to the screen SC, the position detection unit 150 detects the operation position in the actual projection area 11B as an operation area that is set in the screen SC, and the position detection control section 103B outputs the coordinate data of the detected operation position to the PC 13, so that it is possible to perform operations by the pen-type indicator 2 with which only relatively simple operation can be performed, based on image displayed on the screen SC. Therefore, it is possible to achieve the same operability as the operation of the mouse 18 that is a general pointing device, using the pen-type indicator 2.

Second Embodiment

Figure 7:
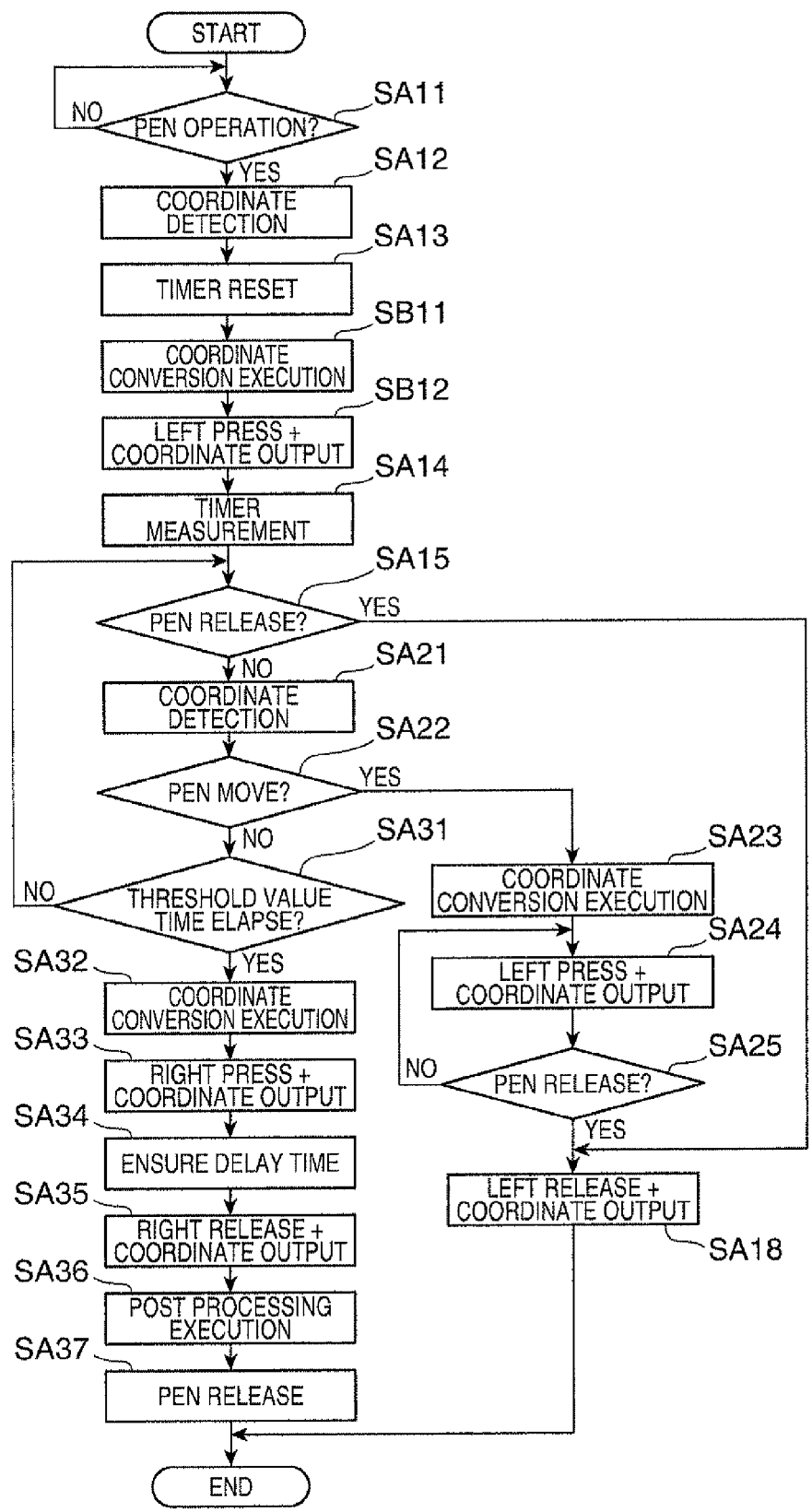
FIG. 7 is a flow chart illustrating an action of the projector in a second embodiment.

FIG. 7 is a flow chart illustrating an action of the projector 11 in a second embodiment to which the invention is applied. In the second embodiment, a description of another example of the action of the projector 11 that is described referring to FIG. 1 to FIGS. 4A and 4B will be made. The configuration of each part of the display system 10 is the same as the first embodiment and has the same reference number, thus the illustration and the description thereof will be omitted.

The actions of FIG. 7 are performed instead of the actions of FIG. 5. Similarly to FIG. 5, the position detection control section 103B waits for the operation that the switch 21 of the pen-type indicator 2 is turned on (Step SA11), and detects the coordinate of the indicated position using the position detection unit 150 (Step SA12) if it is detected that the switch 21 is turned on (Step SA11; Yes).

The position detection control section 103B resets the count value of the built-in timer (Step SA13). Here, the position detection control section 103B converts the position coordinate that is detected in Step SA12 using the coordinate conversion section 160 (Step SB11), and outputs the operation data indicating the press operation of the second mouse button 182 and the coordinate data after conversion to the PC 13 (Step SB12).

The position detection control section 103B starts the measurement using the timer (Step SA14), and determines whether the release operation of the pen-type indicator 2 is detected using the operation detection section 165 (Step SA15). When the release operation of the pen-type indicator 2 is detected (Step SA15; Yes), the position detection control section 103B outputs the operation data indicating the release operation of the second mouse button 182 to the PC 13 (Step SA18), and terminates the processing.

Further, when the release operation of the pen-type indicator 2 is not detected (Step SA15; No), the position detection control section 103B performs the same actions as Step SA21 to SA25, and SA31 to SA37 of FIG. 5.

In the action of FIG. 7, if the press operation of the pen-type instructor 2 is performed, the projector 11 outputs the operation data indicating the press operation of the second mouse button 182 after conversion to the PC 13 in Step SB11 to SB12, without determining whether the release operation of the pen-type indicator 2 is detected (Step SA15 of FIG. 5). For this reason, the PC 13 can immediately start the action corresponding to the press operation of the second mouse button 182. For example, if it is supposed that the PC 13 executes an application program to draw an image according to the operation of the pointing device, this application program starts drawing by the press operation of the second mouse button 182. For this reason, projector 11 outputs the operation data indicating the press operation of the second mouse button 182 in response to the press operation of the pen-type instructor 2 to the PC 13, so that the drawing can be immediately started corresponding to the press operation of the pen-type indicator 2. In this manner, after the press operation of the pen-type indicator 2 is performed according to the specification of the application program that is executed in the PC 13, the operation data indicating the press operation of the second mouse button 182 can be output, without determining whether the release operation of the pen-type indicator 2 is detected. Then, if appropriate operation data of the mouse 18 is output according to the subsequent timing of the release operation of the pen-type indicator 2, various application programs can be comfortably operated.

In addition, the above respective embodiments are only an example of a specific aspect to which the invention is applied, and does not limit the invention. For example, the functions of the imaging section 153 and the imaging control section 155 that the position detection unit 150 of the projector 11 has can be substituted with a digital camera connected to the outside the projector 11. As long as a digital camera can capture an image according to the control of the control section 103 and output the captured image data to the position detection processing section 157, the digital camera may be used. Further, the indicating body which indicates the position on the screen SC is not limited to the pen-type indicator 2, but, for example, may be configured to use the finger of the user as the indicating body and detect the indicated position. Further, for example, it may be configured such that a pressure sensitive touch panel or a capacitive-type touch panel is provided on the screen SC as a display surface, or a display screen in other display manner, and the contact of the pen-type instructor 2 as the indicating body or the finger of the user and the like is detected by the touch panel. In this case, the pen-type indicator 2 without the switch 21 may be used.

Further, a connection manner between the projector and the PC 13 is not limited to a wire connection configuration by a cable and the like, but the projector 11 and the PC 13 may be connected by a wireless communication using a wireless LAN, and the like. Further, the light modulation device 32 is not limited to a configuration using three sheets of transmissive or reflective liquid crystal panels each corresponding to each color of RGB. For example, the light modulation device 32 may be configured by following manners: a manner in which one sheet of liquid crystal panel and a color wheel are combined, a manner using three sheets of digital mirror device (DMD), and a DMD manner in which one sheet of digital mirror device and a color wheel are combined. Here, in a case of using only one sheet of liquid crystal panel or a DMD as a display, a member corresponding to a synthesis optical system such as a cross dichroic prism is not necessary. Further, other than the liquid crystal panel and the DMD, a configuration capable of modulating the light emitted from a light source can be employed without any problem.

Further, the invention can be applied to various display devices and the like other than the projector. For example, the invention can be applied to a liquid crystal monitor which displays an image/a moving image (video) on a liquid crystal display panel, a monitor device which displays the image/the moving image on a liquid crystal television or a PDP (Plasma Display Panel), or a television receiver. Further, the invention can be applied to a monitor device which displays an image/a moving image on an organic EL display panel that is called as an OLED (Organic light-emitting diode), OEL (Organic Electro-Luminescence) and the like, or a self-emitting display device such as a television receiver. In these cases, the liquid crystal display panel, the plasma display panel, the organic EL display panel corresponds to display unit, and the display screen corresponds to the display surface. More specifically, an entire area in which an image can be displayed corresponds to an actual projection area 11B or a projectable area 11A in each embodiment.

Further, each of the functional sections of the projector 11 and the PC 13 that is shown in FIG. 2 and FIG. 3, is a functional configuration that is realized by the cooperation of hardware and software, but the specific embodiment thereof is not particularly limited. Therefore, it is not necessary to mount separate hardware corresponding to each functional section, but it is possible to have a configuration in which one processor realizes a plurality of functional sections by executing a program. Further, in each embodiment, a part of the functions realized by software may be realized by hardware, or a part of the functions realized by hardware may be realized by software. Moreover, the specific and detailed configuration of another each section of the display system 10 including the projector 11 and the PC 13 can be changed within a scope without departing from the spirit of the invention.

Further, the program that the projector 11 and the PC 13 execute may be downloaded and executed from other apparatuses to which the projector 11 and the PC 13 are connected through communication network. Further, the projector 11 and the PC 13 may read and execute the program recorded in a portable recording medium.

Further, in each embodiment, the first input operation is set as the press operation of the pen-type indicator 2 (ON of the switch 21) and the second input operation is set as the release operation of the pen-type indicator 2 (OFF of the switch 21), thus the first input operation is different from the second input operation. However, the invention is not limited thereto, for example, so that the first input operation and the second input operation may be set as the press operation of the pen-type indicator 2, and repeating the same operation may be set as the input operation.

The entire disclosure of Japanese Patent Application Nos. 2012-86717, filed Apr. 5, 2012 and 2013-8976, filed Jan. 22, 2013 are expressly incorporated by reference herein.

What is claimed is:

1. An input display device comprising:
    a controller that controls:
        an operation detection section which detects an input operation;
        a position detection section which detects an operation position of the input operation in an operation area in which the input operation can be detected by the operation detection section; and
        an operation notification section which notifies a first operation and the operation position detected by the position detection section, when a second input operation is not detected within a predetermined time after a first input operation is detected by the operation detection section, wherein
    after the first operation and the operation position detected by the position detection section are notified, the operation notification section notifies a release of the first operation before the second input operation is detected by the operation detection section,
    the operation notification section notifies a second operation different from the first operation, when the second input operation is detected within the predetermined time after the first input operation is detected by the operation detection section,
    the first input operation is a press operation of a switch and the second input operation is a release operation of the switch,
    the first operation is a press operation of a first button of a mouse and the release of the first operation is a release operation of the first button of the mouse,
    the second operation is a press operation of a second button of the mouse, and
    the operation notification section notifies the first operation while the first input operation is performed.

2. The input device according to claim 1,
    wherein after the first operation and an operation position detected by the position detection section are notified, the operation notification section notifies the release of the first operation.

3. The input device according to claim 1,
    wherein the operation notification section notifies the release of the first operation after a predetermined time elapses after the first operation and an operation position detected by the position detection section are notified.

4. The input device according to claim 1,
    wherein the operation notification section performs other process without being accompanied by notification between a time when the first operation and the operation position detected by the position detection section are notified and a time when the second input operation is detected by the operation detection section.

5. The input device according to claim 2,
    wherein after the second input operation is detected by the operation detection section, the operation notification section notifies the release of the first operation.

6. The input device according to claim 1,
    wherein after the second operation is notified, the operation notification section notifies a release of the second operation.

7. The input device according to claim 6,
    wherein the release of the second operation is a release operation of the second button of the mouse.

8. The input device according to claim 1,
    wherein the operation notification section notifies the second operation and the operation position detected by the position detection section.

9. The input device according to claim 1, wherein the input device is configured as a projector,
    the projector including:
        a light modulation section which modulates a light emitted from a light source;
        an image forming section which forms a display image in the light modulation section based on image data; and
        a projection section which projects a display image formed by the image forming section,
    wherein a range that the display image projected by the projection section displays is an operation area.

10. The input device according to claim 1, wherein
    the operation notification section notifies a third operation when the second input operation is not detected within a predetermined time after the first input operation is detected by the operation detection section and the position detection section detects a move distance exceeding a predetermined distance.

11. A display system in which a projector detects an input operation that is input by an indicating body and notifies a computer of an operation in response to the input operation, and the computer executes the operation,
    wherein the indicating body includes an operator and transmitting section which indicates an input operation that is input by the operator to the projector,
    wherein the projector includes
        a light modulation section which modulates a light emitted from the light source;
        an image forming section which forms a display image in the light modulation section based on image data;
        a projecting section which projects a display image formed by the image forming section;
        an operation detection section which detects an input operation that is notified by the indicating body;
        a position detection section which detects an operation position of the input operation detected by the operation detection section in an operation area that the display image that is projected by the projecting section displays; and
        an operation notification section which notifies the computer of a first operation and an operation position detected by the position detection section, when a second input operation is not detected within a predetermined time after a first input operation is detected by the operation detection section, and
    wherein the computer includes a control section which executes the first operation, based on the notification from the operation notification section, and wherein
    after the first operation and the operation position detected by the position detection section are notified, the operation notification section notifies a release of the first operation before the second input operation is detected by the operation detection section,
    the operation notification section notifies the computer of a second operation different from the first operation, when the second input operation is detected within the predetermined time after the first input operation is detected by the operation detection section, the first input operation is a press operation of a switch and the second input operation is a release operation of the switch, the first operation is a press operation of a first button of a mouse and the release of the first operation is a release operation of the first button of the mouse, the second operation is a press operation of a second button of the mouse, and the operation notification section notifies the first operation while the first input operation is performed.

12. The display system according to claim 11,
wherein the control section executes the second operation, based on the notification from the operation notification section.

13. The display system according to claim 12,
wherein the computer includes a pointing device having operators of two or more, and
wherein the operation notification section notifies the computer of the first operation as an operation by the first operator included in the pointing device, and notifies the computer of the second operation as an operation by the second operator included in the pointing device.

14. An input display method, the method comprising:
detecting, by a controller, a first input operation and a second input operation;
detecting, by the controller, an operation position of the input operation in an operation area in which the input operation can be detected; and
notifying, by the controller, a first operation and an operation position, when a second input operation is not detected within a predetermined time after the first input operation is detected,
notifying, after the first operation and the operation position detected are notified, by the controller, a release of the first operation before the second input operation is detected,
notifying a second operation which is different from the first operation, by the controller, when the second input operation is detected within the predetermined time after the first input operation is detected, the first input operation is a press operation of a switch and the second input operation is a release operation of the switch, the first operation is a press operation of a first button of a mouse and the release of the first operation is a release operation of the first button of the mouse, the second operation is a press operation of a second button of the mouse, the notification of the first operation occurs while the first input operation is performed.

15. An input display device comprising:
a controller that controls:
an operation detection section which detects an input operation;
a position detection section which detects an operation position of the input operation in an operation area in which the input operation can be detected by the operation detection section; and
an operation notification section which notifies a first operation and the operation position detected by the position detection section, when a second input operation is not detected within a predetermined time after a first input operation is detected by the operation detection section, wherein after the first operation and the operation position detected by the position detection section are notified, the operation notification section notifies a release of the first operation before the second input operation is detected by the operation detection section, the operation notification section notifies a second operation different from the first operation, when the second input operation is detected within the predetermined time after the first input operation is detected by the operation detection section, the first input operation is a press operation of a switch and the second input operation is a release operation of the switch, the first operation is a press operation of a first button of a mouse and the release of the first operation is a release operation of the first button of the mouse, the second operation is a press operation of a second button of the mouse, and the first input operation and the first operation are performed by different user interfaces simultaneously.

* * * * *